(No Model.) 2 Sheets—Sheet 2.

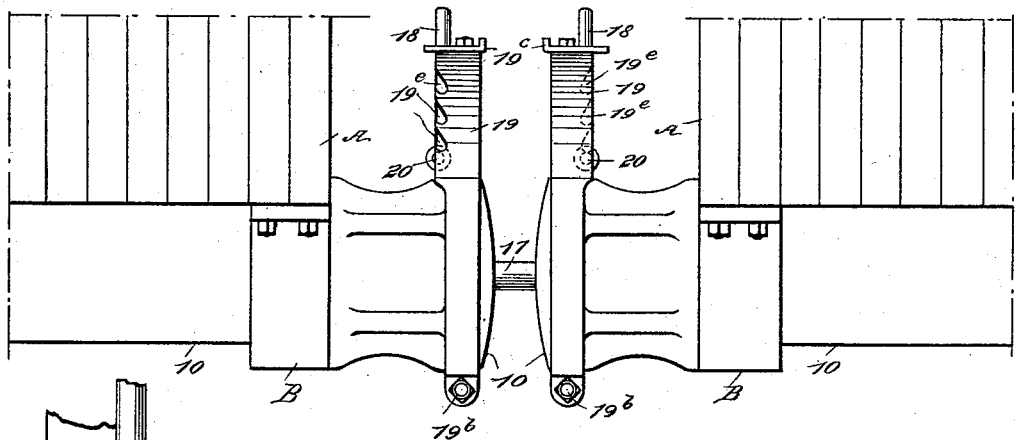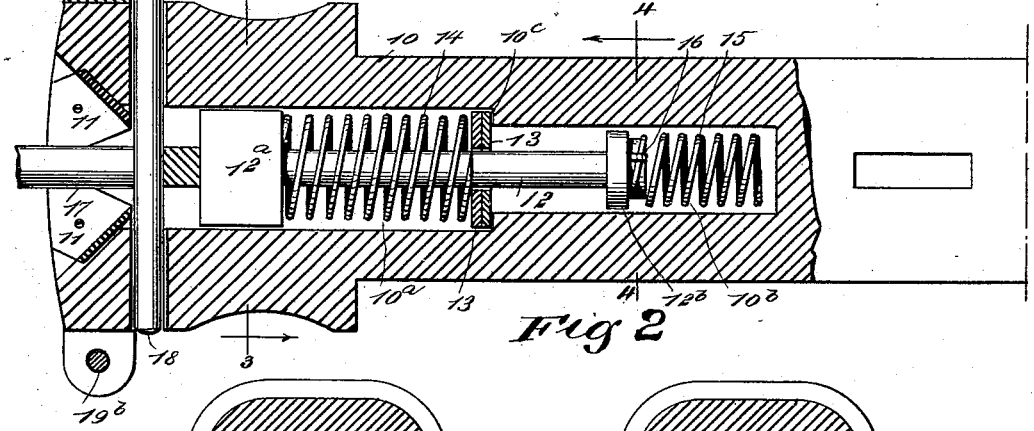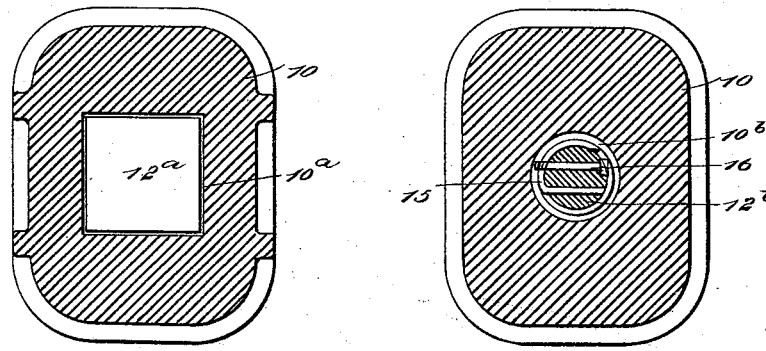

J. A. SISSOM.
CAR COUPLING.

No. 536,051. Patented Mar. 19, 1895.

WITNESSES:
Joshua Bengston
Wm. T. Patton

INVENTOR
J. A. Sissom
BY
Munn & Co.
ATTORNEYS.

UNITED STATES PATENT OFFICE.

JASPER A. SISSOM, OF GALENA, KANSAS.

CAR-COUPLING.

SPECIFICATION forming part of Letters Patent No. 536,051, dated March 19, 1895.

Application filed November 15, 1894. Serial No. 528,893. (No model.)

*To all whom it may concern:*

Be it known that I, JASPER A. SISSOM, of Galena, in the county of Cherokee and State of Kansas, have invented a new and Improved Car-Coupling, of which the following is a full, clear, and exact description.

My invention relates to improvements in automatic car couplings of the link and vertical pin type, and has for its objects to provide a car coupling of the indicated type which will be cheap to produce, be convenient to operate with safety at the side of a car, for the detachment of two coupled cars, and that will be adapted for an automatic coupling of two cars having the improvements.

To these ends my invention consists in the construction and combination of parts, as is hereinafter described and indicated in the claims.

Reference is to be had to the accompanying drawings, forming a part of this specification, in which similar figures and letters of reference indicate corresponding parts in all the views.

Figure 5:
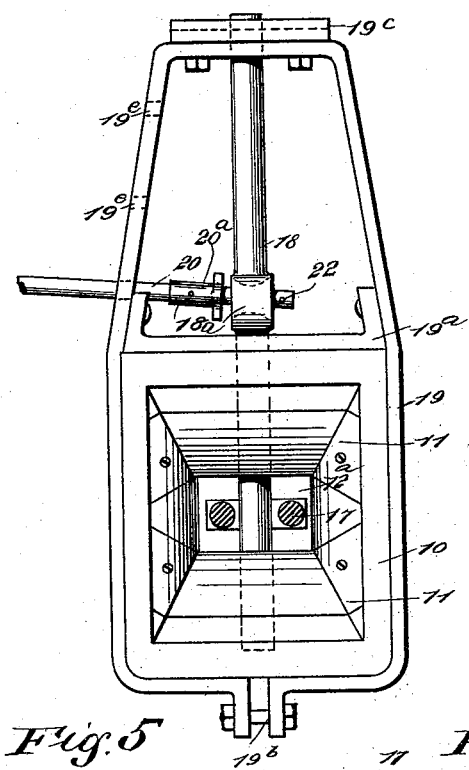
Figure 6:
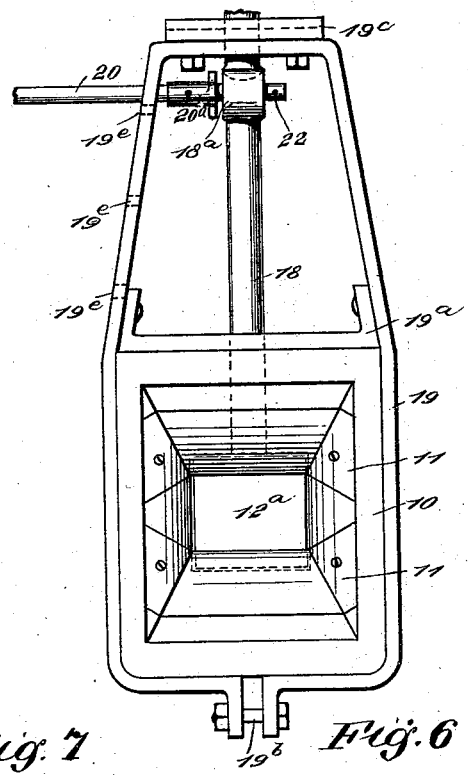
Figure 7:
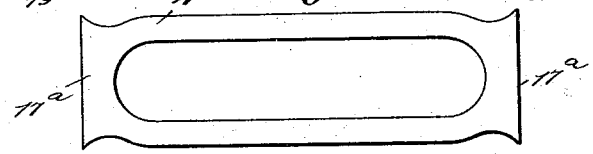
Figure 8:
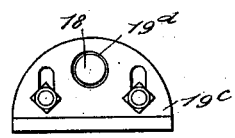
Figure 11:
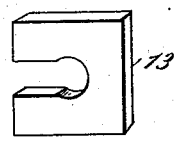
Figure 10:
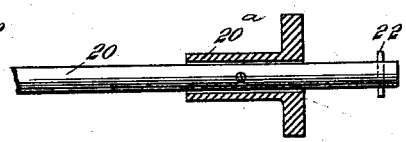
Figure 9:
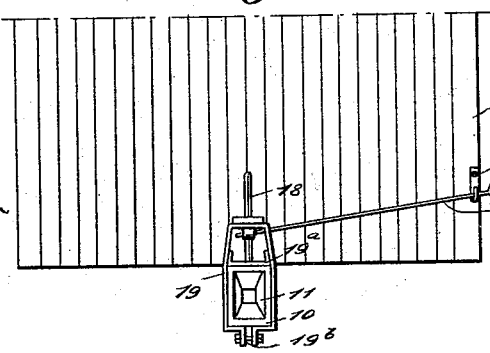

Figure 1 is a side view of the improvements, applied to and coupling two cars in part. Fig. 2 is a partly sectional side view of the coupling drawhead in part, and features of the improvement thereon. Fig. 3 is a transverse sectional view, substantially on the line 3—3 in Fig. 2. Fig. 4 is a transverse sectional view on the line 4—4 in Fig. 2. Fig. 5 is a front end view of the coupling, portions being removed and the coupling link shown in transverse section and coupled to the drawhead. Fig. 6 is a front end view of the devices represented in Fig. 5, in uncoupled adjustment, the link being removed. Fig. 7 is a side view of the improved coupling link. Fig. 8 is a top view of a bracket plate forming a part of the improvement. Fig. 9 is a perspective view of one of a pair of guide blocks forming part of the invention. Fig. 10 is a sectional view in part of a pin-lifting lever and attachment therefor, that are parts of the improvement; and Fig. 11 is a front view of the improvements complete, as applied to a car.

The drawhead 10 is sufficiently elongated to adapt it for effective service on a car A, on which it is held to slide a limited distance endwise by a looped bracket plate B, and is cushioned in the usual manner by spring appliances at the rear, (not shown,) or said drawhead may be firmly secured to the frame of the car at its transverse center so as to project beyond the end, if this is preferred.

The body of the drawhead 10 is longitudinally and axially apertured in two diameters, as at $10^a$, $10^b$, in Fig. 2, thus producing two intersecting chambers of different calibers, the smaller chamber $10^b$ being at the rear of the larger chamber $10^a$. At the front end, the chamber $10^a$ is sufficiently flared on all sides to receive a coupling link, and throat-plates 11 are attached to the flared walls, consisting of metal slabs that fit in shallow recesses in said flared walls of the drawhead, and are secured in place by screws or other suitable means.

The chambers $10^a$, $10^b$ are preferably made rectangular in cross section, and the throat-plates 11 bent to conform with the shape of the forward chamber $10^a$, the inner edges of the plates projecting a short distance past the sides of the chamber $10^a$, so that when in place the said plates serve as border flanges to prevent the complete removal of working parts that will presently be described.

A pusher rod 12 is inserted within the chambers $10^a$, $10^b$, and supported free to slide endwise by a head-block $12^a$ on its front end, and also by two slotted guide blocks 13, that are slid in place from the front of the drawhead. The said blocks, one of which is shown clearly in Fig. 9, serve when in position to guide the pusher bar that passes freely through them, it being understood that their slots are open toward opposite sides of the chamber in which they fit neatly, and that the said blocks bear against each other, and one against the shoulder $10^c$, formed at the junction of the chamber $10^b$ with the chamber $10^a$. A heavy coiled spring 14, is mounted on the pusher bar 12, and has such a proportionate length that when its rear end is seated on one of the guide blocks 13, its forward end, which has contact with the head block $12^a$, will hold the latter projected against the throat piece 11.

The rear end of the pusher bar 12 has a tail block $12^b$, formed on or secured to it, which block is designed to sustain in correct position the coiled reinforcing spring 15, which is preferably held in place on the tail block by inserting a bent end portion of the spring through a transverse perforation in the block 12ᵇ, and then engaging a near coil of the spring with a hook bolt 16, as shown in Fig. 4; that clamps the spring fast on the block, so as to project its body rearwardly and axially from the pusher bar, the length of the reinforcing spring adapting it to seat on the rear of the chamber 10ᵇ when the pusher bar is heavily pressed on from in front. The coupling link 17 is of the usual oblong form, except that it is flattened at the ends 17ᵃ, as shown in Fig. 7, which will adapt either end to have a broad bearing on the head block 12ᵃ.

The top and bottom walls of the drawhead 10, are oppositely perforated near the transverse center of the chamber 10ᵃ, to receive a coupling pin 18, these perforations being located behind and near to the rear face of the throat plates 11. It will be seen that when the pin 18 is lifted but not removed from the drawhead, the force of the spring 14 will project the pusher bar and its head block forwardly, so that the said head block will cover the perforation occupied above it by the pin, and said pin will rest on the block while the pusher bar is in a normal position, and as before indicated, the head block 12ᵃ, will impinge the plates 11, and thus its complete removal from the chamber 10ᵃ is prevented.

If the link 17 is thrust against the head block 12ᵃ with sufficient force, the pusher bar will recede, compressing the spring 14 and permitting the pin 18 to drop by gravity so as to pass through the link, a relaxation of pressure on the latter allowing the stress of the said spring to forwardly push the link against the pin and hold the link horizontally projected.

As it is essential for completion of the improvement that simple and reliable means be provided for lifting the pin 18 from the side of a car having the improved coupling, this feature has been furnished, and consists of parts that will now be described.

A yoke frame 19, of substantially rectangular form and preferably produced from a bent metal bar, is fitted on the front end of the drawhead, so as to permit a portion of the frame to project above the latter. A cross bar 19ᵃ, that is secured to upright members of the frame, serves as an abutment to engage with the top wall of the drawhead, so that when the adjacent end portions of the frame are clamped together at the lower side of the drawhead, as at 19ᵇ, the frame is held in close connection therewith, as represented in Figs. 5 and 6.

The coupling pin 18 is afforded sufficient length to extend from the bottom of the drawhead up through the upper portion of the yoke frame 19, and have a loose engagement with the cap piece 19ᶜ of the latter. Said cap piece is preferably shaped as shown in Fig. 8, comprising a plate that is slotted at two points parallel with each other, for the reception of two bolts which project through or from the top part of the frame proper, whereby said plate or cap-piece is adjustably secured on the top of the frame.

There is a perforation formed in the cap piece 19ᶜ, as indicated at 19ᵈ in Fig. 8, for the free insertion of the upper portion of the pin 18 from below through it. The provision of the cap piece 19ᶜ is made to facilitate the alignment of the perforations in the frame 19 with the pin-holes in the drawhead, so as to insure the free reciprocation of the pin therein.

A lifting rod 20, is part of the pin-operating device, and consists of a bar of a sufficient length to have an engagement with the pin 18, and extend from it to one side of the car body, as shown in Fig. 11. An eye 18ᵃ is formed in the pin 18 at a correct distance from its ends, this formation producing such an enlargement on the pin body that it will serve as an arresting head for the pin, to limit its downward movement in the drawhead, the said enlargement having contact with the top wall of the drawhead when the lower end of the pin is about flush with the lower surface of the drawhead, as shown in Fig. 2.

The preferred method of connecting the lifting rod 20 with the eye in the pin 18, consists in providing a sleeve 20ᵃ that is mounted on the rod, and has a collar on one end, the sleeve being adapted for securing adjustment on the rod, or may have such a close contact therewith as will prevent its accidental sliding movement on the said rod. The sleeve 20ᵃ, is designed to impinge the eye 18ᵃ with its collar when the rod 18 is to be connected with the pin as shown in Figs. 5 and 6, and the outer end of the rod, which is furnished with a handle, loosely rests when not in use in a becket hook 21, or other suitable support on the wall of the car, the removal of the rod from the coupling pin being prevented by a cross pin 22, or by equivalent means.

On the rear edge of the part of the yoke frame 19 that projects above the drawhead 10, a set of rack teeth is cut, as shown at 19ᵉ, these spaced teeth being formed on the side bar of the yoke frame that is nearest to the handle end of the lifting rod 20, and therefore are adapted for the support of said rod when it is made to successively engage with them.

The operation is as follows: The link 17 is introduced and held projected from one of two drawheads that are to be coupled, by means that have already been described, and the cars having the improvements are then moved toward each other on the same track, which will cause the free end of the link to pass into the front end of the opposed drawhead and impinge the head block 12ᵃ in said drawhead. This action will compress the spring 14, and also the reinforcing spring 15, if the shock is unusually great, and permit the pin 18 to drop, it being understood that this pin has been resting on the head block 12ª. This will complete the coupled connection of the two drawheads.

To release two of the improved car couplings that have been connected as just explained, the lifting rod 20, is manipulated so as to vertically vibrate it by operating the same at its outer end, and successively resting the body of the rod on the teeth 19ᵉ, each vibration of the rod serving to elevate the pin a certain degree, the last movement when the rod has had engagement with the uppermost tooth, effecting the proper elevation of the pin 18, so as to release the link 17, which will be expelled by the force of the spring 14.

It is claimed for this car coupling, that it is simple and practical, its working parts being always in position for service. By its use danger usually incurred in coupling and detaching cars having the ordinary link and pin couplings, is avoided. It is also evident that the improved car coupling may be used in connection with a common drawhead, and be coupled thereto by a common pin if the exigencies of railroad service should require this connection to be made.

Having thus described my invention, I claim as new and desire to secure by Letters Patent—

1. In a car coupling, the combination of a drawhead having a chamber to receive a link, the opposite walls of the said chamber having corresponding apertures for the passage of a coupling pin, the said pin, a movable pusher rod located in said chamber with its forward end normally in the path of the said coupling pin and adapted to be engaged by a link when the same is inserted into the chamber in the drawhead, a spring connected to said rod and adapted to hold the same normally in operative position, and a plate secured to the drawhead and projecting inward over the mouth of the chamber and adapted to be engaged by the pusher rod, whereby the same is held in place in the recess.

2. In a car coupling, the combination of a drawhead having a chamber to receive a link, the opposite walls of said chamber having corresponding apertures for the passage of a coupling pin, the said pin, the mouth of said chamber being beveled outwardly to form inclined guide faces for the end of the coupling link, a movable pusher rod located in said chamber with its forward end normally in the path of the said coupling pin and adapted to be engaged by a link when the same is inserted in the chamber, a spring connected to said rod and adapted to hold the same normally in operative position, and throat plates secured to the opposite beveled walls of the mouth of the chamber in the drawhead with their inner ends projecting partially across the mouth of said chamber and adapted to guide the coupling link into said chamber and to be engaged by the end of the pusher rod, whereby the same is held in said chamber, substantially as set forth.

3. In a car coupling, the combination of a drawhead having a chamber to receive the coupling link and having perforations to receive a coupling pin, a frame mounted on the forward end of said drawhead and comprising side pieces and a cap-plate adjustably mounted thereon and provided with an aperture adapted to register with the apertures in the walls of the drawhead, and a coupling pin having an enlarged central portion and reduced ends one of which is adapted to play in the apertures in the drawhead and the other of which is adapted to play through the aperture in the cap-plate of the frame, substantially as set forth.

4. In a car coupling the combination of a drawhead having a chamber to receive the link and apertures to receive the pin, a frame comprising side pieces located at opposite sides of the apertures in the drawhead and provided with serrations forming fulcra, a coupling pin, and a lifting rod connected to said pin and adapted to engage the serrations in said side pieces, substantially as set forth.

5. In a car coupling, the combination of a drawhead having a chamber to receive a coupling link and provided with perforations to receive a coupling pin, and the said coupling-pin having an enlarged perforated central portion and reversible reduced ends adapted to extend through the perforations in the draw-head, substantially as set forth.

JASPER A. SISSOM.

Witnesses:
MATHIAS T. SHELTON,
CHAS. M. YOUNGER.